(12) United States Patent
Atkinson et al.

(10) Patent No.: US 6,540,234 B1
(45) Date of Patent: Apr. 1, 2003

(54) GASKETS

(75) Inventors: Alan William Atkinson, Nr. Rugby (GB); Stephen Peter Bond, Rugby (GB); John Robert Hoyes, Littleborough (GB); Gary Briggs, Leeds (GB); Stephen Alexander Schultze, Rugby (GB); Kevin Richard Holmes, Rugby (GB); Julia Rosalind Mary Hood, Rugby (GB)

(73) Assignee: Flexitallic Investments, Inc., Houston, TX (US)

( * ) Notice: Subject to any disclaimer, the term of this patent is extended or adjusted under 35 U.S.C. 154(b) by 0 days.

(21) Appl. No.: 09/242,414

(22) PCT Filed: Aug. 21, 1997

(86) PCT No.: PCT/GB97/02268
§ 371 (c)(1),
(2), (4) Date: Jul. 9, 1999

(87) PCT Pub. No.: WO98/09101
PCT Pub. Date: Mar. 5, 1998

(30) Foreign Application Priority Data

Aug. 29, 1996  (GB) ............................................. 9618061
May 21, 1997  (GB) ............................................. 9710307

(51) Int. Cl.[7] ................................................. F16L 17/06
(52) U.S. Cl. ........................ 277/612; 277/626; 277/627; 277/648; 277/649; 277/653; 277/314
(58) Field of Search ................................. 277/550, 566, 277/512, 626, 627, 649, 647, 648, 650, 652, 653

(56) References Cited

U.S. PATENT DOCUMENTS

| | | | | |
|---|---|---|---|---|
| 2,898,000 A | * | 8/1959 | Hanny | 220/46 |
| 3,595,588 A | * | 7/1971 | Rode | 277/206 |
| 3,915,462 A | * | 10/1975 | Burns et al. | 277/190 |
| 4,261,584 A | * | 4/1981 | Browne et al. | 277/206 |
| 4,410,186 A | * | 10/1983 | Pierce, Jr. | 277/75 |
| 4,477,087 A | * | 10/1984 | Sutter, Jr. et al. | 277/26 |
| 4,582,330 A | * | 4/1986 | Lew et al. | 277/206 |
| 4,585,238 A | * | 4/1986 | Nicholson | 277/205 |
| 4,850,521 A | * | 7/1989 | Servant | 277/336 |
| 4,877,272 A | * | 10/1989 | Chevallier et al. | 285/111 |
| 5,246,236 A | * | 9/1993 | Szarka et al. | 277/117 |
| 5,354,072 A | * | 10/1994 | Nicholson | 277/206 |
| 5,865,600 A | * | 2/1999 | Mori et al. | 416/198 |

FOREIGN PATENT DOCUMENTS

| | | |
|---|---|---|
| GB | 0495874 A | 11/1938 |
| GB | 1124145 A | 8/1968 |
| WO | WO 8705978 A | 10/1987 |

* cited by examiner

*Primary Examiner*—Anthony Knight
*Assistant Examiner*—Alison K. Pickard
(74) *Attorney, Agent, or Firm*—Haynes and Boone, LLP; John W. Montgomery

(57) ABSTRACT

A gasket (10; 40; 50; 70) comprises a sealing member which forms a closed loop extending around a hole. The sealing member is formed from resilient metal and has a transverse cross section which is generally X-shaped and comprises two arms (12, 14) which project inwardly of the hole, and two arms (16, 18) which project outwardly of the hole. The inwardly projecting arms form a first seal around said hole, and the outwardly projecting arms form a second seal around said hole. Each arm extends from a junction (22) with the remainder of the gasket to a tip (24) of the arm which engages one of the bodies. Each arm has its greatest thickness at said junction (22) and its smallest thickness at a point adjacent to or at said tip (24), the arm continuously reducing in thickness between said junction and said point. The gasket can yield from the tips of the arms inwardly as the pressure on the gasket increases.

28 Claims, 2 Drawing Sheets

GASKETS

Figure 1:
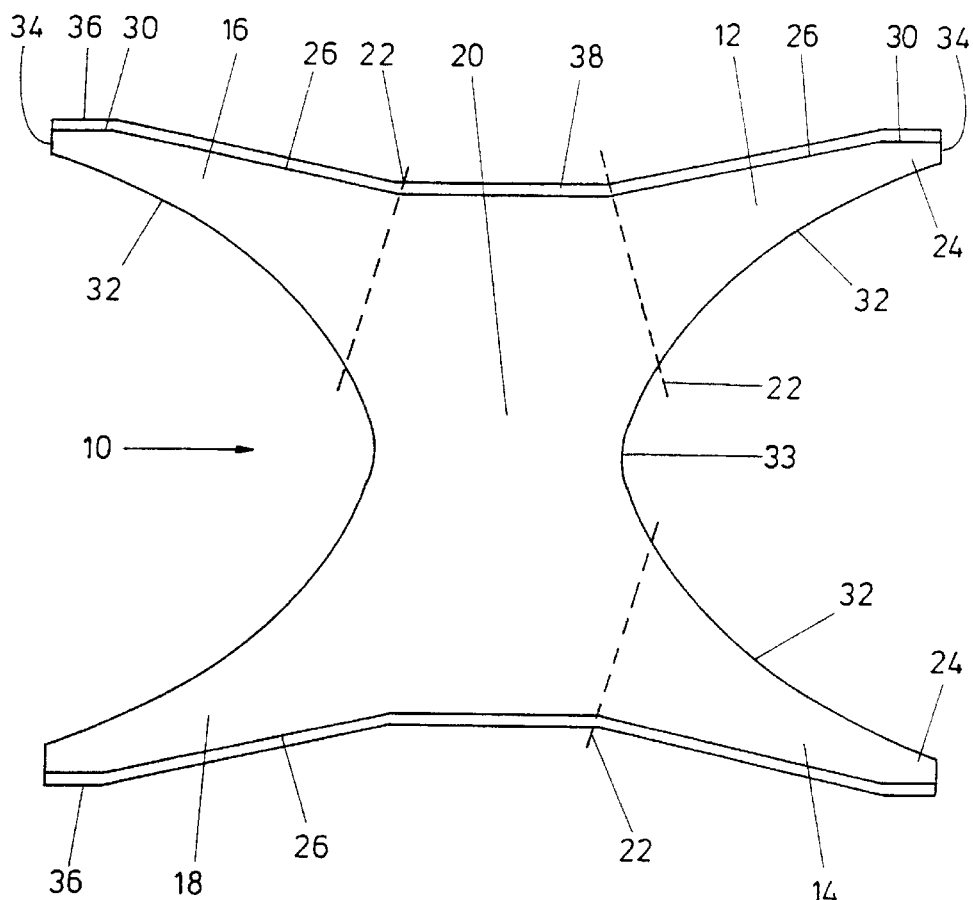

This invention is concerned with gaskets which are adapted when clamped between two bodies to seal with the gap between the bodies around a chamber or passage jointly defined by the bodies. The invention also relates to a method of sealing and two bodies including a gasket. Such a gasket may be used, for example, for sealing the gap between flanges at the ends of pipes.

Gaskets require to be resilient in order to achieve a seal. In some gaskets, the resilience is achieved by using inherently resilient material such as rubber or cork. In other gaskets, the resilience is achieved by utilising metal which resists being bent out of its initial shape. This invention is concerned with a gasket of the latter type which comprises a sealing member which forms a closed loop extending around a hole which corresponds to the chamber or passage and which offers resilient resistance. Such gaskets are often in the shape of an annular ring but may have other shapes. Accordingly, the term "ring" is used herein to include a continuous band surrounding a hole of any shape.

Gaskets made of springy metal are known which have a sealing member which has a generally X-shaped transverse cross-section and comprises two arms which project inwardly of the hole, and two arms which project outwardly of the hole, the inwardly projecting arms being adapted to each resiliently engage one of the bodies to form a first seal around said hole, and the outwardly projecting arms being adapted to each resiliently engage one of the bodies to form a second seal around said hole. Examples of this type of gasket are described in GB 908,044, GB 1,540,465, GB 1,190,537 and 495,874. In these gaskets, the arms have parallel sides and, in some cases, rounded tips. Thus, the arms have substantially equal thickness from their junction with the remainder of the gasket to a point adjacent the tip. It is found in practice that the arms of such gaskets are prone to plastic deformation and/or cracking at their junction with the remainder of the gasket with a consequent loss of seal.

It is an object of the present invention to provide a gasket of the type described which overcomes at least some of the above disadvantages, especially at elevated temperatures and over extended time periods.

One aspect of the present invention provides a gasket adapted when clamped between two bodies to seal the gap between the bodies around a chamber or passage jointly defined by the bodies, the gasket comprising a sealing member which forms a closed loop extending around a hole which corresponds to the chamber or passage, the sealing member being formed from resilient metal, wherein the sealing member comprising two arms which project inwardly of the hole, the inwardly projecting arms being adapted to each resiliently engage one of the bodies to form a first seal around said hole, wherein each arm extends from a junction with the remainder of the gasket to a tip of the arm, and each arm has its greatest thickness at said junction and a lesser thickness away from the junction.

The sealing member may have a cross-section which is generally X-shaped in which two arms project outwardly of a hole with the outwardly projecting arms extending from a junction with the remainder of the gasket to a tip of the arm and with the outwardly projecting arms being adapted to each resiliently engage one of the bodies to form a second seal around the hole.

In a gasket according to the invention, it is found that the continuous reduction in thickness of each arm prevents the build-up of stresses thereby reducing the likelihood of plastic deformation or cracking. Of course, references herein to "thickness" are intended to refer to the minimum thickness, ie the thickness of the arm at any point along the arm is considered to be the shortest distance measured from said point through the arm. Thus, said thickness is not necessarily measured in parallel directions at different points along said arm, because, for example, the arm may be curved.

In a gasket according to the invention, the thickness of each arm may decrease at a constant rate between said junction and said thinnest point. Alternatively, this rate may very. For example, the rate of thickness reduction of the arm may reduce as the thinnest point is approached.

In a gasket according to the invention, each arm may be bounded by a generally frusto-conical surface, which it presents to the body which it engages. Alternatively, this surface may be convex or concave. Each arm may also be bounded by a concave surface, ie the surface which faces away from the body engaged by the arm may be concave. In order to reduce the risk of plastic deformation or cracking at the junction, the sealing member, preferably, has curved surfaces which may be smooth between the junctions of the inwardly projecting arms. References herein to the shapes of surfaces of arms assume that the arms have not been deformed by the application of stress thereto. It is not necessary that the arms be bounded by simple geometric shapes, for example the bounding surfaces may undulate.

A sealing member according to the invention may be formed in one piece as an extrusion which has its ends joined together, ie the extrusion is formed into a loop and has its ends joined together, eg by welding, the weld then being dressed.

In alternative constructions, the sealing member is formed by forming a ring to the required transverse cross-section by machining or by a combination of machining and deformation. The ring can be cut from a sheet, formed from strip with the ends being welded together, cut from the end of a cylinder etc. For example, slots can be machined into the top and the bottom surfaces of the ring (which then has a cross-section in the shape of an "H") and this machined ring can be bent to an X-cross section. The slots can alternatively be machined into the inside and outside surfaces of the ring.

A gasket according to the invention may also comprise layers of deformable material secured to said arms at least in the areas thereof which engage said bodies. This deformable material, which may, for example, be expanded graphite, mica, expanded vermiculite, soft metal or PTFE, is not intended to provide the major sealing force but is intended to fill small fissures or cracks in the body or the arm to thereby improve the seal. The arms may be provided with ridges running circumferentially of the sealing member and the deformable material may cover these ridges. The ridges have the functions of reducing the possibility that the deformable material will be extruded from the seal and of providing local stress concentration.

In order to prevent the sealing member from being crushed to such an extent that resilience is lost, the gasket may also comprise a compression-limiting stop. The stop may be provided by a projection from a central region of the sealing member. Alternatively, a compression-limiting stop may be secured to the sealing member. That stop may be at a central region between the first and second seals. Compression limiting stops may be welded or otherwise secured to both the top and the bottom of the sealing member. It is also possible to position a compression limiting stop between the inwardly facing arms or between the outwardly facing arms, ie such a stop may be in the form of a ring.

Compression stops may also be provided by rings positioned inwardly and/or outwardly of the gasket.

In order to provide different levels of sealing with a single gasket, the inwardly projecting arms of a gasket according to the invention may have a different spacing and stiffness to the outwardly projecting arms. In this case, the further spaced arms can provide a seal at a first, lighter, clamping stress and, the closer spaced arms can provide a seal at a second, higher, clamping stress.

The arms may be arranged to yield from a location away from the junction in a direction towards the junction as the pressure on the gasket is increased.

According to a further aspect of the present invention a method of sealing the gap defined around a chamber or passage jointly defined by two bodies with a gasket comprises clamping the gasket between the two bodies, the gasket comprising a sealing member which forms a closed loop extending around the hole which corresponds to the chamber or passage, the sealing member being formed from resilient metal, comprising two arms which project inwardly of the hole, the inwardly projecting arms each resiliently engaging one of the bodies to form a first seal around said hole, wherein each arm extends from a junction with the remainder of the gasket to a tip of the arm, and each arm has its greatest thickness at said junction and a lesser thickness away from this junction, the method further comprising arranging for the part of the arms that engage with the bodies to move progressively towards the junction as the gasket pressure increases.

The gasket may comprise two arms which project outwardly of the hole which each resiliently engage one of the bodies to form a second seal around the hole with each outwardly projecting arm extending from a junction with the remainder of the gasket to a tip of the arm and with each outwardly projecting arm having its greatest thickness at the junction and a lesser thickness away from this junction, the method comprising arranging for the part of the outwardly projecting arms that engage with the bodies to move progressively towards the junction as the pressure increases.

The rate that the part of the arms that engage with the bodies moves towards the junction as the pressure increases may decrease, given a constant rate of increase of pressure.

The method may comprise the arms yielding as the part of the arms that engage with the bodies moves towards the junction.

The gasket may include layers of deformable material secured to the arms at least in the areas that engage the bodies and the method may comprise the deformable material moving away from the free end of at least one arm as the pressure increases. The method may comprise the deformable material on two arms that engage the same body moving away from the ends of those arms towards each other. In this way the deformable material is concentrated in the centre and pressurised to produce an increasingly efficient area of sealing.

The present invention also includes two bodies defining a chamber or passage incorporated a gasket as herein referred to.

There now follow detailed descriptions, to be read with reference to the accompanying drawings, of four gaskets which are illustrative of the invention.

Figure 4:
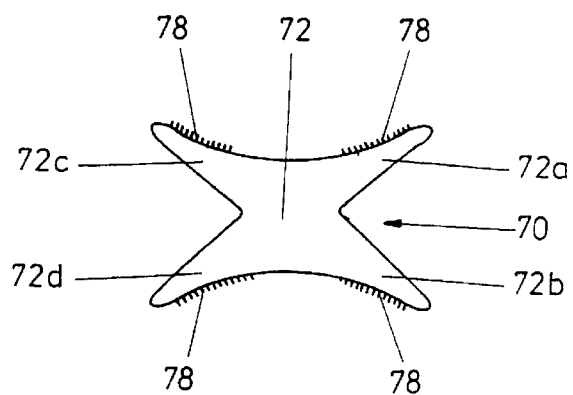
Figure 2:
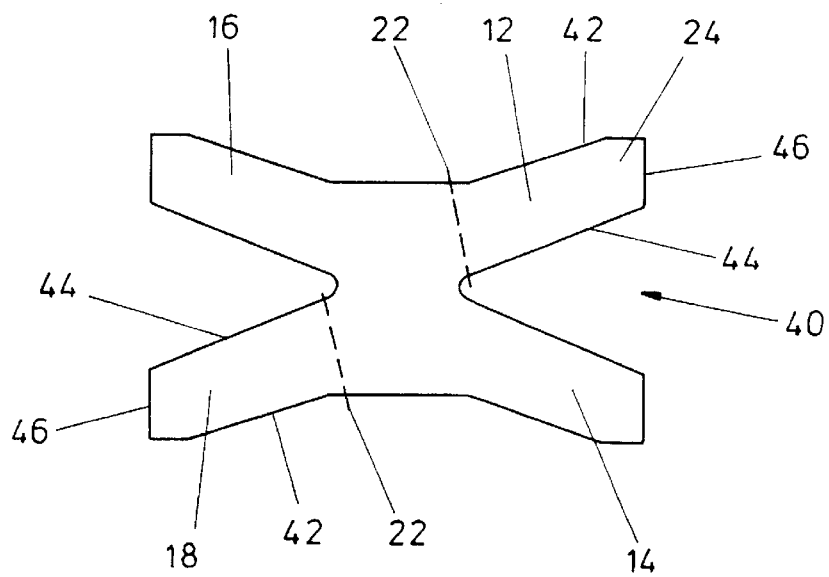
Figure 3:
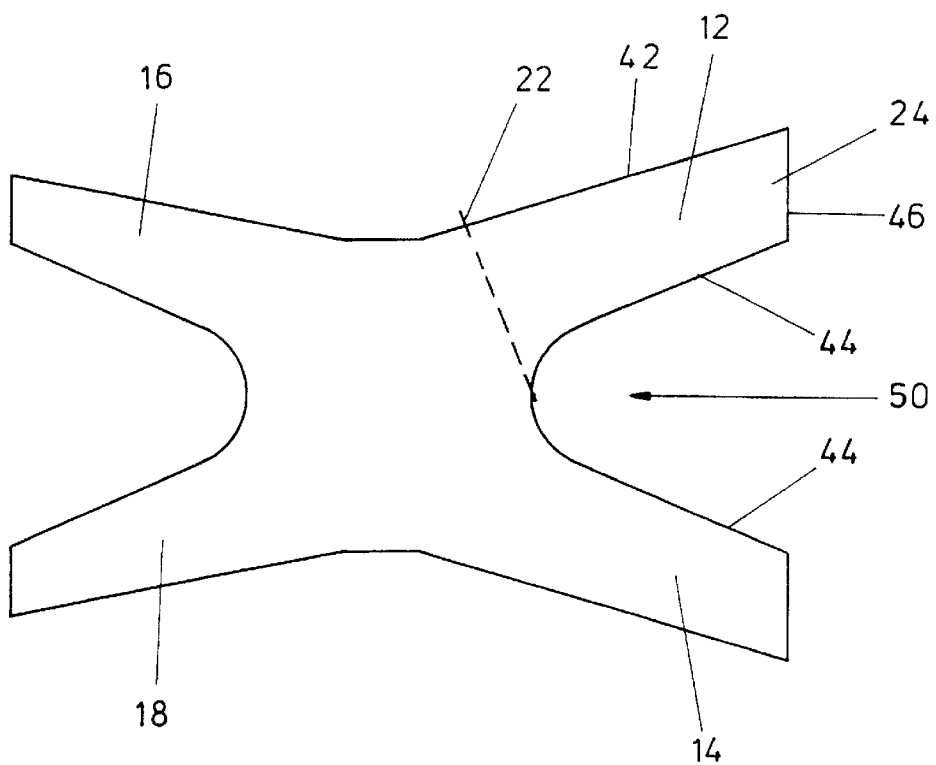

In the drawings:

FIG. 1 is a transverse cross-sectional view taken through one side of the first illustrative gasket; and FIGS. 2, 3 and 4 are views similar to FIG. 1 but of the second, third and fourth illustrative gaskets, respectively.

The first illustrative gasket 10 shown in FIG. 1 is adapted when clamped between two bodies (not shown), for example the bodies may be pipe flanges, to seal the gap between the bodies around a chamber or passage jointly defined by the bodies. The gasket 10 comprises a sealing member which forms a closed circular ring which extends around a hole through the gasket which corresponds to the chamber or passage. FIG. 1 shows a transverse cross-sectional view through one side of the ring.

The sealing member of the gasket 10 is formed from springy or resilient steel by machining a ring of rectangular transverse cross-section.

The sealing member of the gasket 10 has a transverse cross-section which is generally X-shaped (as can be seen from FIG. 1). This cross-section comprises two arms 12 and 14 which project inwardly of the hole through the gasket 10, and two arms 16 and 18 which project outwardly of said hole. The arms project from a solid central junction or portion 20 of the sealing member of the gasket 10.

The inwardly projecting arms 12 and 14 are adapted to each resiliently engage a respective one of the bodies, when the gasket 10 is in use, in order to form a first seal around the hole through the gasket. In other words, the arm 12 engages one of the bodies, eg a first flange, and, as the clamping pressure increases, the deformation of the arm 12 causes pressure to build up along the line of engagement between the arm and the flange (as the arm is deformed the line of engagement moves from the tip of the arm gradually towards the central portion 20).

Alternatively, as the pressure builds up at the tip, the tip will initially flex slightly under the resilience of the metal in an elastic manner. However after a certain pressure the metal at the tip will yield to cause a part of the arm nearer to the central portion to then resiliently engage and seal with the body. If the arm were of the same thickness along its length then the bending moment of the force on the tip would cause plastic yielding adjacent to the main body leading to a loss of seal and even cracking of the arm.

As the pressure on the arm increases, the arm will offer a greater resilient resistance to that pressure, as the distance from the main body of the gasket and the point of engagement with the body reduces, and also a greater pressure is required to cause the gasket to yield as the thickness of the arm increases in the direction towards the main body. However, the gasket will not yield at any point nearer to the gasket than the seal and will only yield at that point that engages the arm thereby ensuring that the gasket remains fully functionable.

The same action as described above for the arm 12 in relation to the first flange also occurs in relation to the arm 14 and the other body, eg a second flange, and also for the other arms 16 and 18.

The outwardly projecting arms 16 and 18 are adapted to each resiliently engage a respective one of the bodies to form a second seal around the hole through the gasket. The arms 16 and 18 act in similar manner to the arms 12 and 14 to press against the bodies. The lines of engagement of the arms 16 and 18 with the respective bodies constitute the second seal.

The arms 12, 14, 16 and 18 are of identical shape so that only the arm 12 will be described in detail, the same reference numerals being used for like parts of the arms 14, 16 and 18. The arm 12 projects away from the central portion of the gasket 10 in a direction which is inclined inwardly of the hole through the gasket and inclined upwardly relatively to the portion 20 (the arm 14 is inclined inwardly and downwardly and the arms 16 and 18 are inclined outwardly and, respectively, upwardly and downwardly).

The arm 12 extends from a junction 22 with the remainder of the gasket 10, specifically with the central portion 20, to a tip 24 of the arm which engages one of the bodies. On its upper side, the arm 12 is bounded by a generally frusto-conical upwardly-inclined surface 26, which it presents to the body which it engages. The surface 26 extends from the junction 22 to a point adjacent to the tip 24 where it meets a short horizontal annular surface 30 which extends to the tip 24.

On its lower side, the arm 12 is bounded by a concave surface 32 which extends from the junction 22 to the tip 24 (where the surfaces 30 and 32 are joined by a vertical surface 34). The surfaces 26, 30 and 32 are so arranged that the arm 12 has its greatest thickness at the junction 22 and its smallest thickness at a point at said tip 24. Specifically, the thickness of the arm 12 reduces continuously between said junction 22 and its thinnest point at said tip 24. The reduction in thickness is a factor of approximately eight (reductions by other factors are possible in variations of the gasket 10). The rate of thickness reduction of the arm 12 is not constant but is at its greatest adjacent to the junction 22 and reduces as the thinnest point is approached. The surfaces 32 of the arms 12 and 14 are joined by a smoothly-curved surface 33 of the central portion 20.

The gasket 10 also comprises layers of deformable material 36, specifically expanded graphite, which are secured by adhesive to the surface 30 and 26, and to horizontal surfaces 38 of the central portion 20 which joint the surfaces 26. Thus, these layers 36 are on the areas of the arms which engage said bodies. The deformable material layers 36 may be relatively thin, for instance 10 microns, and may be between, for example 10 microns to 3 mm thick, depending possibly on the state of the flanges to be sealed. The deformable material improves sealing by filling cracks or fissures in the bodies of the arms and the surface to be sealed.

The deformable material may be graphite, PTFE, vermiculite or soft deformable metal, for instance.

The deformable material also provides enhanced sealing of the gasket in that, as the point of sealing of the arms 12 and 14 approaches the main body of the gasket, the deformable material is pushed or squeezed radially outwardly. However, that material is unable to escape and indeed is met by sealing material being squeezed in the opposite direction by the arms 16 and 18. Consequently as the pressure increases, there is a build up of the deformable material in the central region of the gasket and the sealing property of the gasket is enhanced still further.

At the limit position, the portions of the arms nearest the main body will exert a resilient pressure on the bodies without yielding as they are only flexed by an extremely small amount.

The gasket 10 provides two seals (one provided by the arms 12 and 14 and the other by the arms 16 and 18) so that the possibility of leakage is reduced. The gasket 10 is found to have a reduced risk of plastic deformation or cracking of its arms at their junction with the main body.

The second illustrative gasket 40 shown in FIG. 2 is similar to the first illustrative gasket 10 except as hereinafter described and like reference numerals are used in FIG. 2 for like parts. The gasket 40 differs from the gasket 10 in the shape of its arms 12, 14, 16 and 18, although it retains the feature that the thickness of each arm reduces continuously between its junction 22 with the central portion 20 and a thinnest point of the arm at its tip 24. In this case, however, the rate of thickness reduction is constant along the arm. Specifically, each arm 12, 14, 16 and 18 is bounded by two frusto-conical surfaces 42 and 44 which are joined at the tip 24 by a vertical surface 46. In this embodiment the surface of the inner arms 44 and the surface of the outer arms meet in the form of V as opposed to a smooth curve. The layers 36 have been omitted from FIG. 2.

The third illustrative gasket 50 shown in FIG. 3 is the similar to the second illustrative gasket 40 except as hereinafter described and like reference numerals are used in FIG. 3 for like parts. The gasket 50 differs from the gasket 40 in that the arms 12 and 14 thereof are differently spaced compared to the arms 16 and 18, being further apart. Furthermore, the arms 12 and 14 are thicker than the arms 16 and 18. This allows the gasket to seal at different levels of clamping stress.

The fourth illustrative gasket 70 shown in FIG. 4 has its sealing member formed from a single piece of metal 72 which is extruded with a transverse cross-section which is generally X-shaped. After extrusion, the piece 72 is formed into a ring and its ends are welded together. The piece 72 has two arms 72a and 72b which project inwardly of the hole through the gasket. These arms act in similar manner to the arm 12 and 14 of the gasket 10. The gasket 70 also has two arms 72c and 72d which project outwardly of the hole through the gasket. These arms act in similar manner to the arms 16 and 18 of the gasket 10. The central region of the piece 72 between the arms 72a and 72c is of greater thickness than the thickness of the two inner arms combined or the two outer arms combined so that it provides a compression-limiting stop. If desired, the compression-limiting stop may be provided by a ring on one or both sides of the gasket in the region of the central area and protruding therefrom. The gasket 70 also comprises layers of deformable material 78 on the arms 72a, 72b, 72c and 72d which act in similar manner to the layers 36 of the gasket 10. The piece 72 could alternatively be formed by machining a ring of rectangular or other suitable transverse cross-section to the required transverse cross-section.

Any of the gaskets may be formed as any extrusion which has its ends joined together or from a rectangular bar that has been ring welded and machined or in one piece by machining.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A gasket adapted when clamped between a first body and a second body to seal the gap between the first and second bodies around a chamber or passage jointly defined by the bodies, the gasket comprising:
   a sealing member which forms a closed loop extending around a hole which corresponds to the chamber or passage, wherein the sealing member being formed from resilient metal; and
   in cross-section, the sealing member comprises a first arm and a second arms which project inwardly of the hole, the inwardly projecting first and second arms being adapted to resiliently engage the first and second bodies, respectively, to form a first seal around said hole, wherein
      the first arm extends from a first junction with the remainder of the gasket to a tip of the first arm,
      the second arm extends from a second junction with the remainder of the gasket to a tip of the second arm,
      the first arm has its greatest thickness at said first junction and a lesser thickness away from the first junction characterized in that the first arm is arranged, in use, to initially resiliently flex and subsequently plastically yield from a location away from the first junction in a direction towards the first junction as the clamping pressure on the gasket increases thereby causing the part of the first arm that resiliently engages and seals with the first body to move from a location away from the first junction towards the first junction, and
      the second arm has its greatest thickness at said second junction and a lesser thickness away from the second junction characterized in that the second arm is arranged, in use, to initially resiliently flex and subsequently plastically yield from a location away from the second junction in junction in a direction towards the second junction as the clamping pressure on the gasket increases thereby causing the part of the second arm that resiliently engages and seals with the second body to move from a location away from the second junction towards the second junction.

2. A gasket as claimed in claim 1 wherein the sealing member has a cross-section which is generally X-shaped in which in which a third arm and fourth arm project outwardly of the hole, wherein
   the outwardly projecting third arm extends from a third junction with the remainder of the gasket to a tip of the third arm,
   the outwardly projecting fourth arm extends from a fourth junction with the remainder of the gasket to a tip of the fourth arm, and
   the outwardly projecting third and fourth arms being adapted to each resiliently engage the first and second bodies, respectively, to form a second seal around the hole.

3. A gasket as claimed in claim 2 wherein the thickness of the first, second, third, and fourth arms decrease in a direction away from the first, second, third, and fourth junctions, respectively.

4. A gasket according to claim 3, wherein the thickness of the first, second, third, and fourth arms decrease at a constant rate in a direction away from the first, second, third, and fourth junctions, respectively.

5. A gasket according to claim 3, wherein a rate of thickness reduction of the first, second, third, and fourth arms reduces in a direction away from the first, second, third, and fourth junctions, respectively.

6. A gasket as claimed in claim 2 in which the first, second, third, and fourth arms have their small thickness at a point adjacent to or at the tips of the first, second, third, and fourth arms, respectively.

7. A gasket according to claim 2 wherein the inwardly projecting first and second arms have a different spacing to the outwardly projecting third and fourth arms.

8. A gasket as claimed in claim 1 wherein the thickness of the first and second arms decrease in a direction away from the first and second junctions, respectively.

9. A gasket according to claim 8, wherein the thickness of the first and second arms decrease at a constant rate in a direction away from the first and second junctions, respectively.

10. A gasket according to claim 8, wherein a rate of thickness reduction of the first and second arms reduces in a direction away from the first and second junctions, respectively.

11. A gasket as claimed in claim 1 in which the first and second arms have their small thickness at a point adjacent to or at the tips of the first and second arms, respectively.

12. A gasket according to claim 1, wherein the first and second arms are each bounded by a generally frusto-conical surface, which the first and second arms present, respectively, to the first and second bodies which they engage.

13. A gasket according to claim 12, wherein the first and second arms are further each bounded by a concave surface.

14. A gasket according to claim 1, wherein the first and second arms are each bounded by a convex surface, which the first and second arms present, respectively, to the first and second bodies that they engage.

15. A gasket according to claim 14, wherein the first and second arms are also each bounded by a concave surface.

16. A gasket according to claim 1, wherein the sealing member is formed in one piece as an extrusion which has its ends joined together.

17. A gasket according to claim 1, wherein the sealing member is formed in one piece by machining.

18. A gasket according to claim 1, wherein the gasket further comprises layers of deformable material secured to said first and second arms at least in the areas thereof which engage said first and second bodies, respectively.

19. A gasket according to claim 1, wherein the gasket further comprises at least one compression-limiting stop.

20. A gasket according to claim 19, wherein the compression-limiting stop is provided by a projection from a central region of the sealing member.

21. A gasket according to claim 19, wherein the compression-limiting stop is provided by at least one ring.

22. An embodiment comprising:
   a first body;
   a second body, wherein the first and second bodies define a chamber or passage; and
   a gasket as claimed in claim 1, incorporated with the first and second bodies.

23. A method of sealing the gap defined around a chamber or passage jointly defined by a first body and a second body with a gasket comprising:
   clamping the gasket between the first and second bodies,
   forming a closed loop with the gasket extending around the hole which corresponds to the chamber or passage, wherein the gasket comprises
   a sealing member, wherein the sealing member being formed from resilient metal, the sealing member comprises a first arm and a second arm which project inwardly of the hole, the inwardly projecting first and second arms resiliently engaging the first and second bodies, respectively, to form a first seal around said hole, wherein the first arm extends from a first junction with the remainder of the gasket to a tip of the first arm, the second arm extends from a second junction with the remainder of the gasket to a tip of the second arm, the first arm has its greatest thickness at said first junction and a lesser thickness away from the first junction, characterized in that, as the clamping pressure on the gasket increases, an outer part of the first arm initially resiliently flexes and resiliently engages and seals with the first body with that part then plastically yielding to cause the part of the first arm that subsequently engages and seals with the first body to move from a location away from the first junction towards the first junction, and the second arm has its greatest thickness at said second junction and a lesser thickness away from the second junction, characterized in that, as the clamping pressure on the gasket increases, an outer part of the second arm initially resiliently flexes and resiliently engages and seals with the second body with that part then plastically yielding to cause the part of the second arm that subsequently resiliently engages and seals with the second body to move from a location away from the second junction towards the second junction.

24. A method as claimed in claim 23 which the gasket further comprises a third arm and a fourth arm which project outwardly of the hole which each resiliently engages the first and second bodies, respectively, to form a second seal around the hole wherein the outwardly projecting third arm extends from a third junction with the remainder of the gasket to a tip of the third arm and has its greatest thickness at the third junction and a lesser thickness away from the third junction, and the outwardly projecting fourth arm extends from a fourth junction with the remainder of the gasket to a tip of the fourth arm and has its greatest thickness at the fourth junction and a lesser thickness away from the fourth junction, and the method further comprises arranging for the part of the outwardly projecting third and fourth arms that engage with the first and second bodies, respectively, to move progressively towards the third and fourth junction as the gasket pressure increases.

25. A method as claimed in claim 24 wherein a rate that the part of the first and second arms that engage with the first and second bodies, respectively, and the part of the third and fourth arms that engage with the first and second bodies, respectively, moves towards the first, second, third, and fourth junctions, respectively, as the gasket pressure increases, decreases given a constant rate of increase of gasket pressure.

26. A method as claimed in claim 25 wherein the deformable material on the first and third arms that engage the first body moving away from the ends of the first and third arms towards each other.

27. A method as claimed in claim 23 wherein a rate that the part of the first and second arms that engage with the first and second bodies, respectively, moves towards the first and second junctions, respectively, as the gasket pressure increases, decreases given a constant rate of increase of gasket pressure.

28. A method as claimed in claim 23 wherein the gasket includes layers of deformable material secured to the first and second arms at least in the areas that each engage the first and second bodies, respectively, and the method further comprising the deformable material moving away from a free end of at least the first arm or the second arm as the pressure increases.

* * * * *